(12) United States Patent
Konno (10) Patent No.: US 7,318,946 B2
(45) Date of Patent: Jan. 15, 2008

(54) ANTISTATIC FILM MANUFACTURING METHOD

(75) Inventor: Takeshi Konno, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 858 days.

(21) Appl. No.: 10/682,540

(22) Filed: Oct. 10, 2003

(65) Prior Publication Data

US 2004/0130048 A1   Jul. 8, 2004

(30) Foreign Application Priority Data

Oct. 11, 2002   (JP) ............................. 2002-299684

(51) Int. Cl.
*B05D 3/06*   (2006.01)
*B05D 3/14*   (2006.01)

(52) U.S. Cl. .................... 427/8; 427/470; 427/160; 427/177; 427/419.2; 427/419.3; 427/419.5

(58) Field of Classification Search .................. None
See application file for complete search history.

(56) References Cited

U.S. PATENT DOCUMENTS 4,330,618 A * 5/1982 Minamizono et al. ...... 430/528
4,571,361 A * 2/1986 Kawaguchi et al. ........ 428/328

* cited by examiner

*Primary Examiner*—William Phillip Fletcher, III
(74) *Attorney, Agent, or Firm*—Young & Thompson (57) ABSTRACT

Antistatic films are designed and manufactured so as to have proper electrification properties that are previously defined according to types and applications of the antistatic films on the basis of simulated outbreaks of static trouble such as static marks and/or static clinging of sample films having electrostatic charges (V) and surface resistivity (R) either one or both of which differ stepwise from one another that are expressed in R-V orthogonal coordinate diagrams.

24 Claims, 7 Drawing Sheets

ANTISTATIC FILM MANUFACTURING METHOD

BACKGROUND OF THE INVENTION

1. Field of the Invention

The present invention relates to a method of manufacturing films superior in antistatic property, and, more particularly, to an antistatic film manufacturing method suitable for manufacturing antistatic films such X-Ray films, cinematographic color positive films and color proof films that are under protection from static troubles such as an occurrence of static marks and/or static clogging and adhesion of film flour or dust.

2. Description of Related Art

There have been proposed various approaches to preventing an occurrences of static troubles of photographic and radiographic films due to static electricity or contact electrification such as static marks occurring to X-Ray and clinging between cinematographic color positive films and between color proof films. Conventionally, it is an established theory that static troubles of these photographic and radiographic films are cleared away as long as only increasing electric leakage performance of the film. In light of the established theory, approaches have been centrally focused on lowering surface resistivity of the films.

However, in recent years, it is found that films encounter clinging aggravated rather than insignificant when providing the films with low resistivities for enhanced electric leakage performance. That is, static troubles occur due to various factors other than electrification properties and electric leakage performances. For example, silver films cause static marks owing to surface texture such as surface irregularities as well as their electrification properties and electric leakage performances. Further, plastic sheet films such as X-Ray films cause clinging under the influence of planarity, elastic behaviors, friction coefficient, etc of them as well as their electrification properties and electric leakage performances. For this reason, there is a strong demand for improvement and development of technique of preventing the films from occurrences of static troubles such as static marks and static clinging.

SUMMARY OF THE INVENTION

It is therefore an object of the present invention to provide a method of manufacturing antistatic films that are superior in antistatic property and immune to outbreaks of static troubles such as static marks of X-Ray films, static clinging of cinematographic color positive films and color proof films, adhesion of film flour and/or dust to these films.

On intensive studies, the inventor of this application has attained the knowledge that troubles of films due to static electricity (contact electrification) are attributed to a balance of electrostatic property and charge leakage efficiency of the film and that electrification characteristics of all types of films can be clearly defined on the basis of an R-V orthogonal coordinates diagram of electrical conductivity (surface resistivity) R and electrostatic property (surface potential) V.

That is, the inventive subject matter is directed to manufacturing antistatic films having proper electrification properties that are defined according to types and applications of the antistatic films on the basis of simulated outbreaks of static trouble such as static marks and/or static clinging of sample films having electrostatic charges (V) and surface resistivity (R) either one or both of which differ stepwise from one another that are expressed in R-V orthogonal coordinate diagrams.

Specifically, the method of manufacturing an antistatic film comprising the steps of preparing a plurality of sample films having electrostatic charges (V) and surface resistivity (R), at least one of the electrostatic charges (V) and surface resistivity (R) differing stepwise from one another, making a simulation of static trouble outbreaks by running the sample films through a given simulation equipment under specified conditions, expressing electrostatic charges (V) and surface resistivity (R) of the sample films that cause static troubles in the simulation of static troubles in an R-V orthogonal coordinate diagram and defining a proper rang of electrostatic property for the antistatic film on the R-V orthogonal coordinate diagram that excludes electrostatic charges (V) and surface resistivity (R) of the sample films that cause unacceptable static troubles. When designing and manufacturing films so as to have an electrification property falling within the proper range, the films do not run into static troubles. This antistatic film manufacturing method of the present invention is favorably applied especially to X-Ray films, cinematographic color positive films and color proof films.

According to the method of manufacturing antistatic films applied to X-Ray films, sample X-Ray films are made different stepwise in electrostatic charges by adding one or more surface active agents selected from a group of fluorochemical surface active agents and polyoxyethylene surface active agents to surface protection layers of the sample X-Ray films. Further, the sample X-Ray films are made different stepwise in surface resistivity by adding fine particles of one or more metal oxides selected from a group of $ZnO$, $TiO_2$, $SnO_2$, $TAl_2O_3$, $In_2O_3$, $SiO_2$, $MgO$, $BaO$ and $MoO$ to surface protection layers of the sample X-Ray films.

The simulation of static trouble outbreaks of the sample X-Ray films is carried out under the ambient conditions of a temperature in a range from 10° C. to 35° C. and a relative humidity lower than 25% and, desirably under the greatest level of loading that is applied to the antistatic X-Ray films during practical use. Further, the simulation of static trouble outbreaks is carried out by running the sample X-Ray film by rollers made of either one of chloroprene rubber and nitrile rubber under conditions of a film transport speed in a range from 10 m/min to 20 m/min and a nip pressure in a range from 4 kg/cm² to 5 kg/cm².

The proper range of electrostatic property for the antistatic X-Ray film is defined by a range of surface resistivity from $10^{11}$ Ω to $10^{14}$ Ω between electrostatic charges of $-0.8 \times 10^{-9}$ and $1.2 \times 10^{-9}$ Q/cm². When designing and manufacturing an antistatic X-Ray film so as to satisfy the proper range of electrification property, the X-Ray film does not run into static mark troubles due to electrostatic charges produced through contact electrification.

According to the method of manufacturing antistatic films applied to an endless cinematographic film wound in a roll, sample cinematographic color positive films are different stepwise in electrostatic charges by adding one or more surface active agents selected from a group of fluorochemical surface active agents and polyoxyethylene surface active agents to the surface protection layers. Further, the sample cinematographic color positive films are made different stepwise in surface resistivity by adding fine particles of one or more metal oxides selected from a group of $ZnO$, $TiO_2$, $SnO_2$, $TAl_2O_3$, $In_2O_3$, $SiO_2$, $MgO$, $BaO$ and $MoO$ to the backing layers. The simulation of static trouble outbreaks is carried out under the greatest level of loading that is applied to the antistatic cinematographic color positive films during practical use. The simulation of static trouble outbreaks is carried out by running the sample cinematographic color positive film by brain rollers made of either one of chloroprene rubber and nitrile rubber under the conditions of a film transport speed in a range from 10 m/min to 20 m/min and a nip pressure in a range from 4 kg/cm$^2$ to 5 kg/cm$^2$ and desirably under the ambient conditions of a temperature in a range from 10° C. to 35° C. and a relative humidity lower than 25%.

The proper range of electrostatic property for the antistatic cinematographic color positive film is defined by a range of surface resistivity greater than $10^{9.5}$ Ω.

The cinematographic color positive film withdrawn from a roll is charged with positive static at a top surface (a surface protection layer) through contact with and detachment from brain rollers of a platter type cinematographic projector. Simultaneously, the cinematographic color positive film induces counter charges (negative charges) at a back surface (backing layer) opposite to the protection surface. At the same time, positive charges of the cinematographic color positive film at the back surface flow into convolutions (rolled portions) of the cinematographic color positive film that has a comparatively large electrostatic capacity. When the convolutions of the cinematographic color positive film is low in surface resistance at the back surface, the rolled portions of the cinematographic color positive induce negative charges at their back surfaces, so as thereby to cause the convolutions of the cinematographic color positive film to cling to one another by the influence of coulombic attraction.

However, when designing and manufacturing a cinematographic color positive films so as to satisfy the proper range, the cinematographic color positive film does not run into static clinging troubles.

According to the method of manufacturing antistatic films applied to a color proof film, simulation of static trouble outbreaks is carried out under a condition that a sample color proof film is ejected into a stack of a plurality of, desirably four or five, sample color proof films. The sample color proof films are made different stepwise in electrostatic charges by adding one or more surface active agents selected from a group of fluorochemical surface active agents and polyoxyethylene surface active agents to the surface protection layers and also made different stepwise in surface resistivity by adding fine particles of one or more metal oxides selected from a group of ZnO, TiO$_2$, SnO$_2$, TAl$_2$O$_3$, In$_2$O$_3$, SiO$_2$, MgO, BaO and MoO to the backing layers. The simulation of static clinging outbreaks is carried out under ambient conditions of a temperature in a range from 10° C. to 35° C. and a relative humidity lower than 25%.

The proper range of electrostatic property for the antistatic color proof film is defined by a range of surface resistivity greater than $10^{11}$ Ω regardless of electrostatic charges and a range of surface resistivity less than $10^{11}$ Ω between surface potentials of −0.5 kV and 0.5 kV $10^{-9}$.

When printed color proof films are stacked. Each stacked color proof film is highly insulative and, in consequence, keeps electrostatic charges from escaping therefrom, so that the stack of printed color proof films has a potential boosted up according to the number of stacked color proof films. Therefore, a printed color proof film discharged on the stack of color proof films induces counter charges at the back surface. In consequence, the discharged color proof film and the uppermost one of the stack of color proof films cling to each other due to coulombic attraction between the electostatic charges and counter charges.

However, when designing and manufacturing a color proof film so as to satisfy the proper range, the color proof film does not run into static clinging troubles.

It is preferred to employ the surface active agent expressed by the following chemical formula among the above mentioned fluorochemical surface active agents.

$n = 5$

It is preferred to employ the surface active agent expressed by the following chemical formula among the above mentioned polyoxyethylene surface active agents.

BRIEF DESCRIPTION OF THE DRAWINGS

The above and other objects and features of the present invention will be clearly understood from the following detailed description when read with reference to the accompanying drawings, in which.

DETAILED DESCRIPTION OF THE PREFERRED EMBODIMENTS

The antistatic film manufacturing method of the present invention includes performing simulation of occurrences of static troubles such as static marks and/or static clinging by running sample films which have electrostatic properties different from one another under specified conditions, defining a proper range of electrostatic charges described in surface potential (V) and electric leakage performance described in surface resistivity (R) film on an R-V diagram in which occurrences of static troubles of the sample films resulting from the simulation are expressed in the form of orthognal coordinates, and designing and manufacturing antistatic films so as to satisfy the proper range of electrification property. The proper range of electrification property for an antistatic film is established by defining a range excluding static troubles occurred on the sample films that are unacceptable for antistatic films in an R-V orthognal coordinate diagram of electrostatic charges (V) and surface resistivity (R) which expresses static trouble outbreaks of the sample films resulting from the static trouble outbreak simulation at x-y coordinates of the electrostatic charges (V) and surface resistivity (R) of the film.

In this instance, it is preferred to use sample films having electrostatic charges (which is described as surface potential V if convenient) and surface resistivity, either one or both of which are different stepwise from one another, for the simulation. It is further preferred to define the proper range of electrification property differing according to types and/or applications of intended antistatic films. The antistatic film manufacturing method of the present invention places no restraints on types and/or applications of antistatic films and is, however, favorably applied especially to X-Ray films, cinematographic color positive films and color proof films.

X-Ray films that are to be manufactured by the antistatic film manufacturing method of the present invention have at least one silver halide emulsion layer on a film base and, if necessary, may further have various layers such as a surface protection layer, an intermediate layer, a backing layer, an antihalation layer and an antistatic layer. There are no specific restrictions on structures and film materials of X-Ray films.

In manufacturing antistatic X-Ray films, a static mark outbreak simulation is performed using sample X-Ray films which are different stepwise in either one or both of electrostatic charges (V) and surface resistivity (R) from one another. A proper range of electrification property for the antistatic X-Ray film is established by defining a range excluding static marks occurred on the sample X-Ray films that are unacceptable for the antistatic X-Ray film in the R-V orthognal coordinate diagram of electrostatic charges (V) and surface resistivity (R). X-Ray films that are designed and manufactured so as to have an electrification property falling within the proper range of electrification property is reliably prevented from getting static marks.

In order for the sample X-Ray films to build up electrostatic charges differing stepwise from one another, it is preferred to add one or more surface active agents selected from a group of fluorochemical surface active agents and polyoxyethylene surface active agents to surface protection layers of the sample X-Ray films. Such a fluorochemical surface active agent decreases electrostatic charges of the sample X-Ray films, in other words, shifts surface potentials of the sample X-Ray films toward the minus side. On the other hand, such a polyoxyethylene surface active agent increases electrostatic charges of the sample X-Ray films or shifts surface potentials of the sample X-Ray films toward the plus side. The stepwise variations in electrostatic charges of the sample X-Ray films are easily realized through quantitative adjustment of these fluorochemical and/or polyoxyethylene surface active agents.

Although commercially available fluorochemical surface active agents can be utilized without any restraints and selectively employed according to types of X-Ray films, it is preferred to employ fluorochemical surface active agents expressed by the following chemical formulas I to V.

(I)

n = 5

$C_8F_{17}SO_2NCOOK$ (II)

(III)

(IV)

Rf:$C_8F_{17}$(50%), $C_{10}F_{21}$(35%), $C_{12}F_{25}$ $C_{14}F_{29}$(30%), $C_6F_{13}$(2%) (V)

Among them, it is especially preferred to employ the fluorochemical surface active agent expressed by the chemical formula I. The added mass of fluorochemical surface active agent is desirably in a range from 0.01% to 0.5% of the mass of the surface protection layer of the sample X-Ray film.

Although commercially available polyoxyethylene surface active agents can be utilized without any restraints and selectively employed according to types of X-Ray films, it is preferred to employ fluorochemical surface active agents expressed by the following chemical formulas VI to IX.

(VI)

n = 8.5

$C_{12}H_{25}$—O—$(CH_2CH_2O)_n$—H n=10 (VII)

$C_{16}H_{33}$—O—$(CH_2CH_2O)_n$—H n=10 (VIII)

(IX)

Among them, it is especially preferred to employ the polyoxyethylene surface active agent expressed by the chemical formula IX. The added mass of polyoxyethylene surface active agent is in a range from 0.02 weight % to 0.5 weight % of the mass of the surface protection layer of the sample X-Ray film.

Further, in order to provide the sample X-Ray films with surface resistivity different stepwise, it is preferred to add fine particles of a metal oxide selected from a group of ZnO, $TiO_2$, $SnO_2$, $TAl_2O_3$, $In_2O_3$, $SiO_2$, MgO, BaO and MoO to a surface protection layer of the sample X-Ray film. Among them, it is especially preferred to add fine particles of $SnO_2$. The added mass of metal oxide fine particles is in a range from 10 weight % to 95 weight % of the mass of the surface protection layer of the sample X-Ray filin.

It is preferred to perform the static mark outbreak simulation using the sample X-Ray films under the ambient conditions of a temperature in a range from 10° C. to 35° C. and a relative humidity lower than 25%, more desirably under the ambient conditions of a temperature in a range from 20° C. to 25° C. and a relative humidity lower than 20%. Further, in light of adaptability to variations in film transport condition of commercially available X-Ray equipments, it is preferred to perform the static mark outbreak simulation of the sample X-Ray films under the greatest level of loading applied to the sample X-Ray films traveling in an X-Ray photographic equipment or an X-Ray film processing equipment employed as a simulator. More specifically, the static mark outbreak simulation under the greatest level of loading is performed using a film transport mechanism 5 with a transport roller 6 made of chloroprene rubber or nitrile rubber of a X-Ray photographic equipment or a X-Ray film processing equipment such as schematically shown by way of example in FIG. 1. The simulation is made under the conditions of a film transport speed of 10 m/min to 120 m/min and a nip pressure of 4 to 5 kg/cm$^2$, and more preferably, the conditions of a film transport speed of 60 to 120 m/min and a nip pressure of 3 to 5 kg/cm$^2$.

Although commercially available X-Ray photographic equipments can be utilized as a simulator equipment regardless with their types and selectively employed according to applications of antistatic X-Ray films, it is preferred to employ, for example, high speed cameras such as a cerebral camera, automatic film transport equipments such as an automatic film feeder, a film receive/supply equipment and a film changer, X-Ray televisions, automatic film processors or the like.

Figure 4:
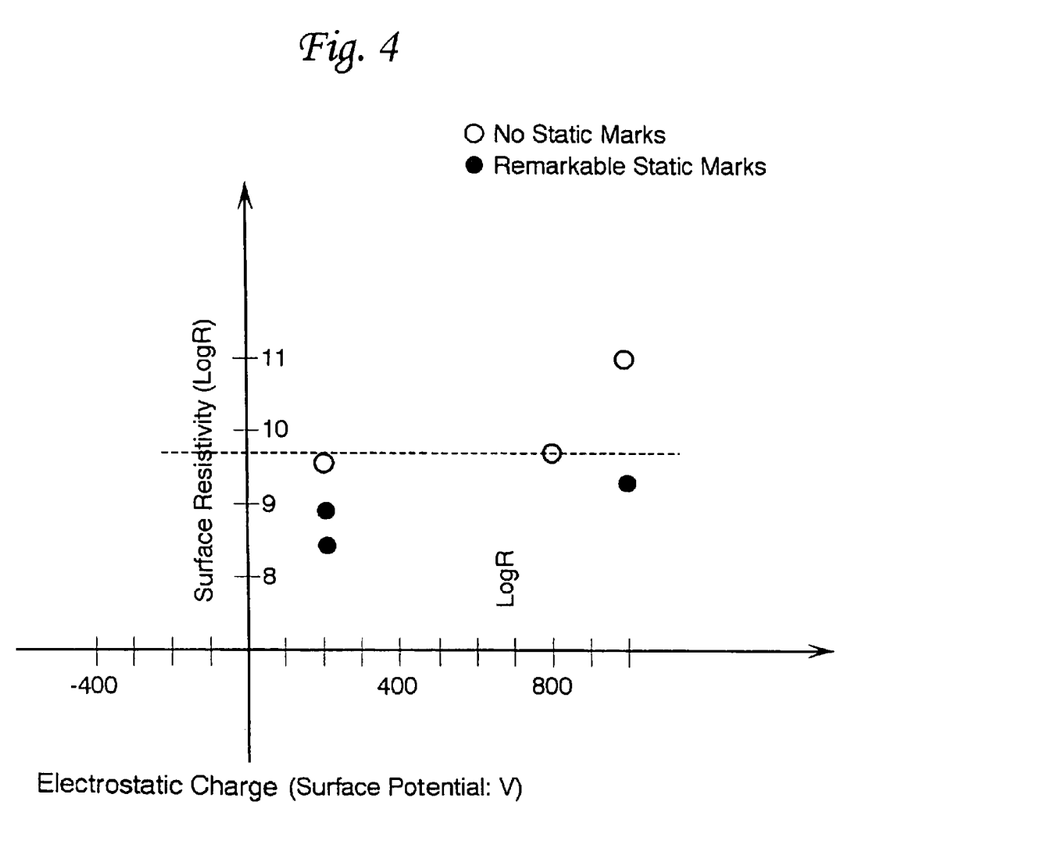
FIG. 4 is an R-V diagram showing a proper range of electrification property for prevention of clinging between cinematographic color positive films by way of example.

The R-V diagram is drawn from the result of the static mark simulation of the sample X-Ray films such as shown in FIG. 4 on the basis of evaluation of occurrences of static marks. The sample X-Ray films that are considered acceptable as antistatic X-Ray films have electrification properties in a range of surface resistivity from $10^{11}$ to $10^{14}$ Ω between limits of electrostatic charges of $-0.8 \times 10^{-9}$ and $1.2 \times 10^{-9}$ Q/cm$^2$. Accordingly, the proper range of electrification property for antistatic X-Ray films is a range of surface resistivity from $10^{11}$ to $10^{14}$ Ω between limits of electrostatic charges of $-0.8 \times 10^{-9}$ and $1.2 \times 10^{-9}$ Q/cm$^2$. Any types of X-Ray films that are designed and manufactured so as to have electrification properties falling within the proper range are reliably prevented from causing static troubles such as static marks.

Cinematographic color positive films that are to be manufactured by the antistatic film manufacturing method of the present invention comprise silver halide emulsion layers (which generally include at least one red sensitive emulsion layer, one green sensitive emulsion layer and one blue sensitive emulsion layer) coated on a film base and, if necessary, may further comprise layers such as a surface protection layer, an intermediate layer, a backing layer, an antihalation layer and an antistatic layer. There are no specific restrictions on structures and film materials of cinematographic color positive films, and commercially available cinematographic color positive films are favorably manufactured by the antistatic film manufacturing method of the present invention.

In manufacturing an antistatic cinematographic color positive film, sample cinematographic color positive films that are different in one or both of electrostatic charges (V) and surface resistivity (R) stepwise from one another and static clinging simulation of the sample color proof films is performed. A proper range of electrification property for antistatic cinematographic color positive film is established by defining a range excluding static clinging occurred in the sample cinematographic color positive films that are unacceptable for the antistatic cinematographic color positive film in the R-V orthognal coordinate diagram of electrostatic charges (V) and surface resistivity (R). Cinematographic color positive films that are designed and manufactured so as to have electrification properties falling within the proper range of electrification property is reliably prevented from causing static clinging.

In the case where an endless cinematographic color positive film is wound in a roll, it is preferred to add one or more surface active agents selected from a group of fluorochemical surface active agents and polyoxyethylene surface active agents to the top layers, namely the surface protection layers, of the sample cinematographic color positive films so as thereby to provide the sample cinematographic color positive films with electrostatic charges differing stepwise from one another. The same fluorochemical surface active agents and polyoxyethylene surface active agents as utilized in the sample X-Ray films described above can be employed. Further, it is preferred to add fine particles of a metal oxide to bottom layers, namely backing layers, of the sample cinematographic color positive films so as thereby to provide the sample cinematographic color positive films with surface resistivity differing stepwise from one another. The same fine particles of metal oxide as utilized in the sample X-Ray films described above can be employed.

In light of variations in environmental conditions and/or film transport conditions, it is preferred to perform the static clinging simulation of the sample cinematographic color positive films desirably under the greatest level of loading applied thereto in a cinematographic projector. Although commercially available cinematographic projectors can be utilized as a simulator equipment regardless with their types and desirably selectively employed according to applications of cinematographic color positive films, it is preferred to employ a horizontal platter type of cinematographic projector provided with an endless film feeder 50 such as schematically shown by way of example in FIG. 3.

Figure 3:
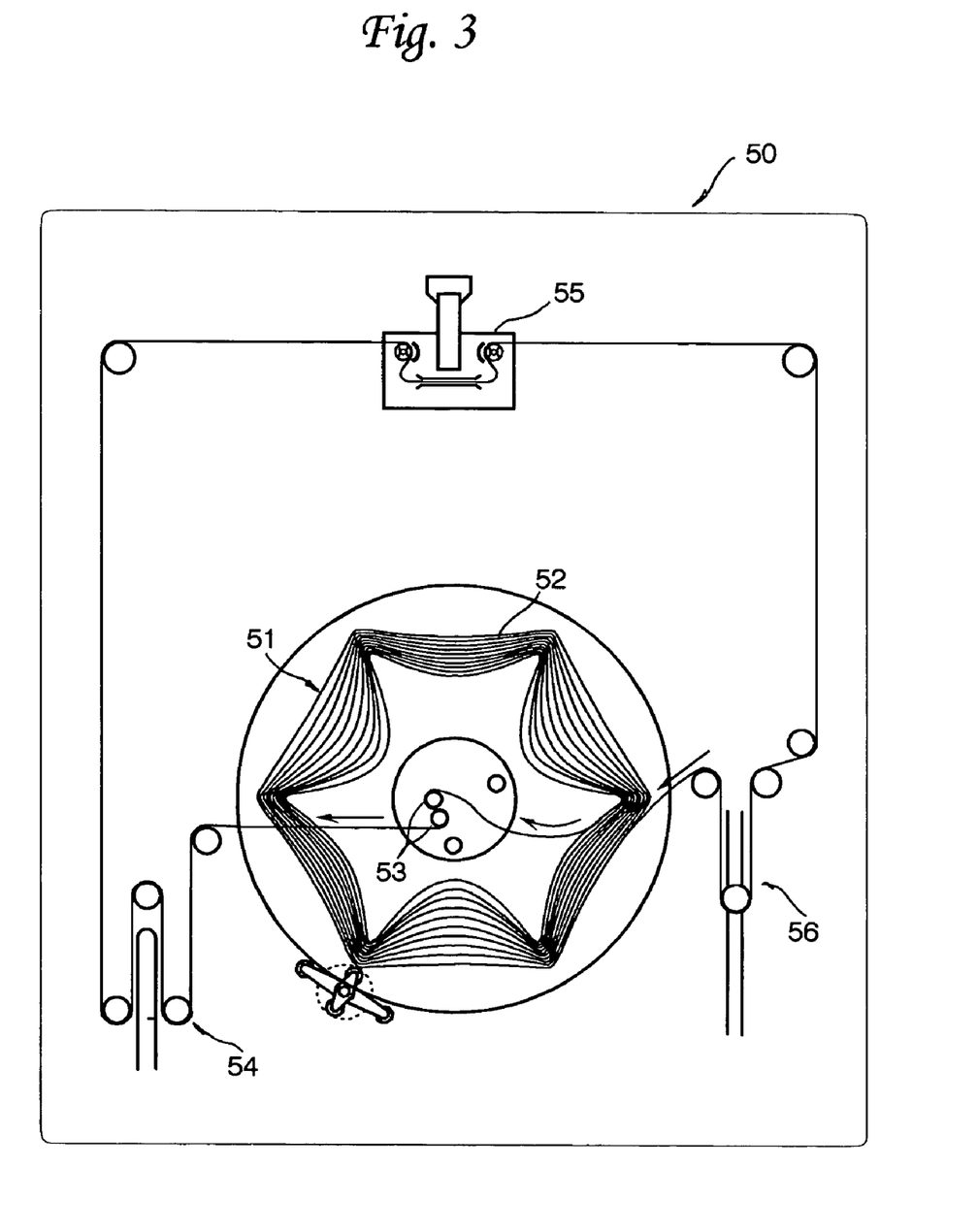
FIG. 3 is a schematic view showing the aspect of transport of a cinematographic color positive film.

The endless film feeder 50 of a horizontal platter type cinematographic projector operates as follows.

An endless cinematographic color positive film 52 in a roll 51 such as a cockade roll, a torus-shaped roll or the like received in a case is unwound from the innermost convolution of the roll 51. The cinematographic color positive film 52 is transported by a pair of brain rollers 53 of a brain mechanism B at a controlled speed and travels to a projector unit 55 passing through guide rollers 54 and is projected by the cinematographic projector unit 55. Subsequently, the cinematographic color positive film 52 travels passing through guide rollers 56 and then is wound up around the outermost convolution of the roll 51. The color positive film 52 is endlessly routed in the endless film feeder 50. While passing through between the brain rollers 53, the cinematographic color positive film 52 is rubbed by the brain rollers 53 and electrically charged in consequence. The cinematographic color positive film 52 is caused to electrostatically clinging between convolutions of the roll 51.

It is desirable to perform the static clinging simulation of the sample cinematographic color positive films under the ambient conditions of a temperature in a range from 10° C. to 35° C. and a relative humidity lower than 25%, more desirably the ambient conditions of a temperature in a range from 20° C. to 25° C. and a relative humidity lower than 20%. It is preferred to transport the cimematographic color positive film 52 at a speed in a range from 5 m/min to 100 m/min, more desirably in a range from 30 m/min to 80 m/min, when the brain rollers 53 are made of chloroprene rubber or nitrile rubber.

The R-V diagram is drawn from the result of the static clinging simulation of the sample cinematographic color positive films as shown in FIG. 4 on the basis of evaluation of occurrences of static clinging. The sample cinematographic color positive films that are considered acceptable as antistatic cinematographic color positive films have electrification properties in a range of surface resistivity greater than $10^{9.5}$ $\Omega$ regardless of with electrostatic charges. Accordingly, the proper range of electrification property for antistatic cinematographic color positive films is a range of surface resistivity greater than $10^{9.5}$ $\Omega$ regardless of with electrostatic charges. Any cinematographic color positive films that are designed and manufactured so as to have electrification properties falling within the proper range do not run into static clinging troubles.

Antistatic color proof films that are to be manufactured by the antistatic film manufacturing method of the present invention comprises silver halide emulsion layers (which generally include at least one red sensitive emulsion layer, one green sensitive emulsion layer and one blue sensitive emulsion layer) coated on a film base and, if necessary, may further comprise layers as such as a surface protection layer, an intermediate layer, a filter layer, an antihalation layer, a backing layer and a white reflection layer. There are no specific restrictions on structures and materials of color proof films, and commercially available color proof films are favorably manufactured by the antistatic film manufacturing method.

Sample color proof films that are different in either one or both of electrostatic charges (V) and surface resistivity (R) stepwise from one another are prepared and static clinging simulations of the sample color proof films is implemented under specified conditions. A proper range of electrification property for antistatic color proof film is established by defining a range excluding static clinging occurred in the sample color proof films that are unacceptable for the antistatic color proof film in the R-V orthognal coordinate diagram of electrostatic charges (V) and surface resistivity (R). Color proof films that are designed and manufactured so as to have electrification properties falling within the proper range is reliably prevented from causing static clinging.

Figure 5:
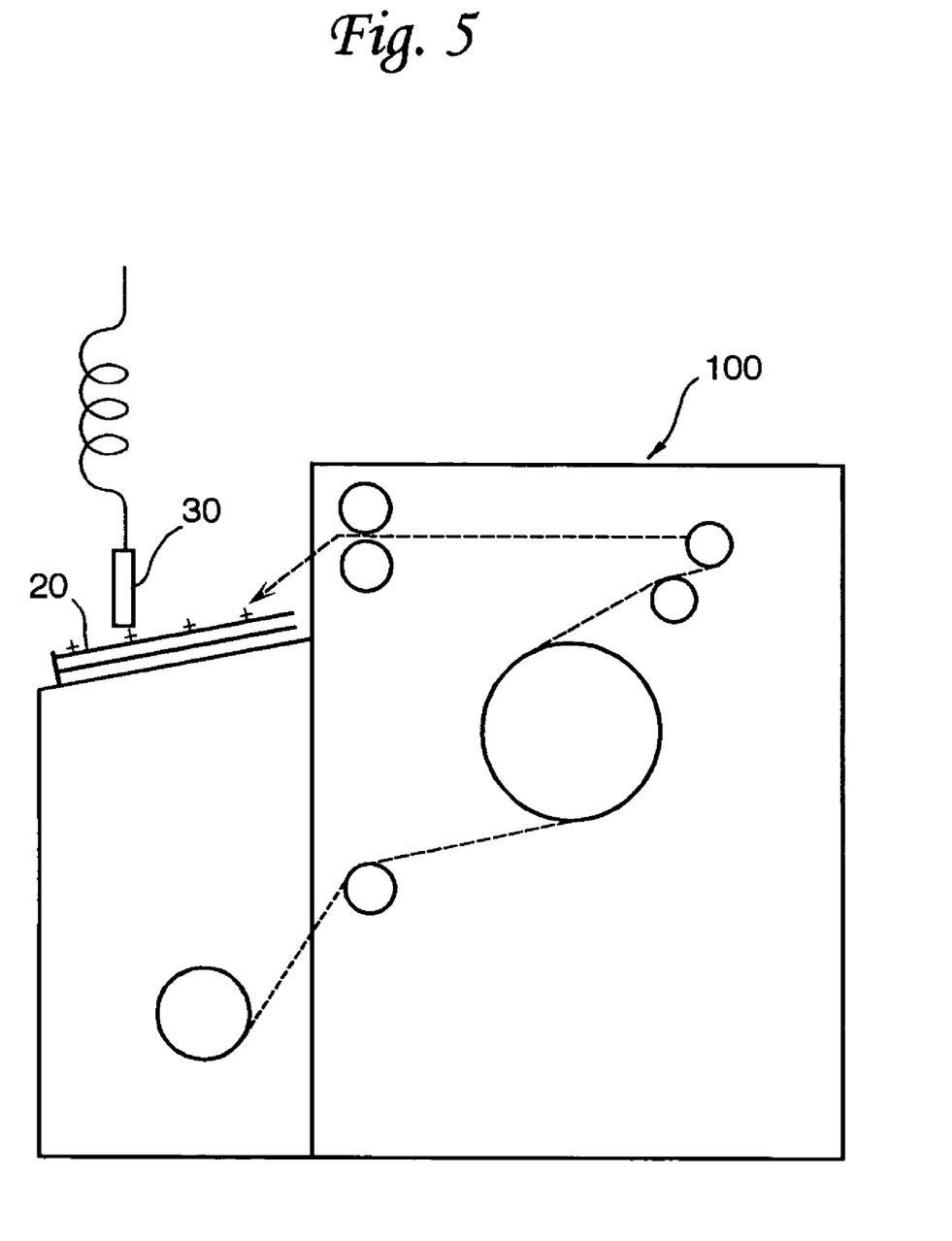
FIG. 5 is a schematic view showing an apparatus for discharging a color proof film.
Figure 6:
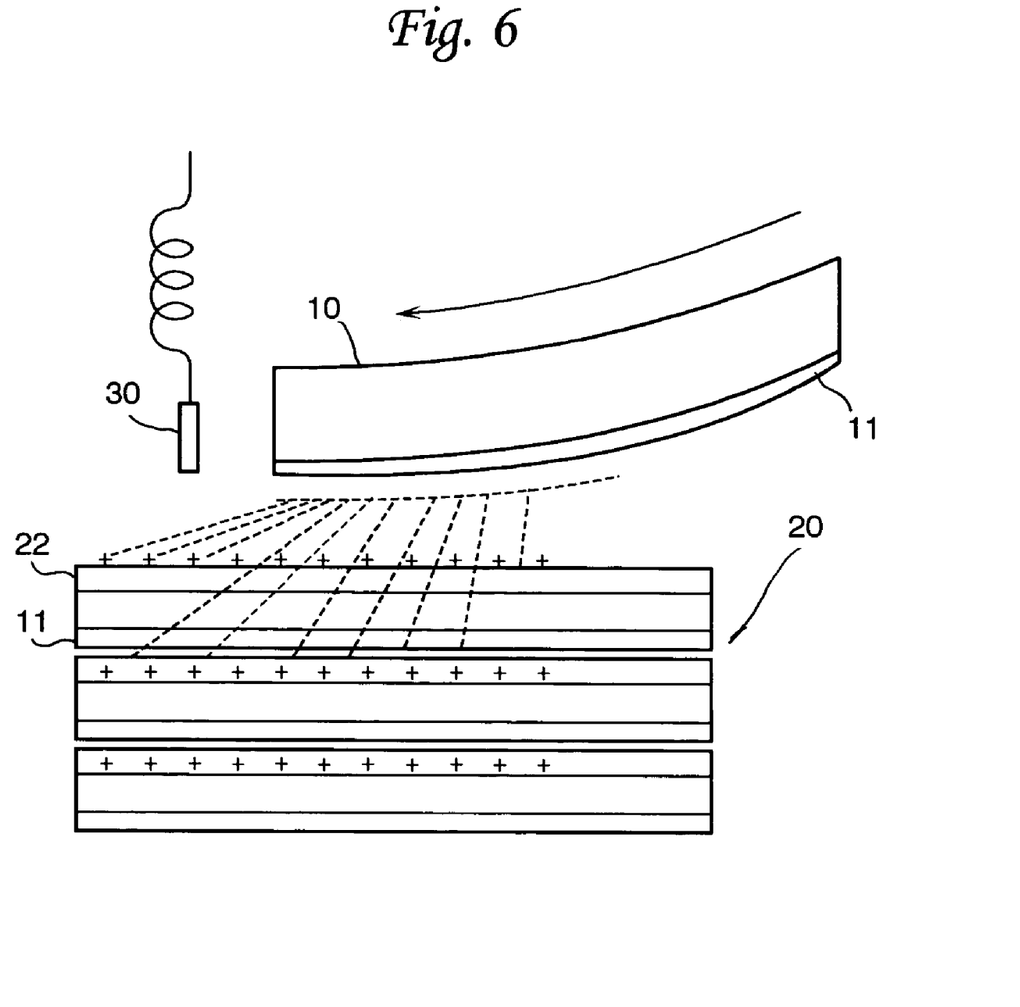
FIG. 6 is a schematic illustration showing discharging of a printed color proof film onto a attack of color proof films.

The static clinging simulation is performed using a color printing machine 100 as a simulator equipment such as shown in FIGS. 5 and 6 or a color copying machine in such a way to discharge a sample color proof film 20 into a stack in a direction indicated by an arrow in FIG. 5. Electrostatic charges of the sample color proof film 20 are measured by an electrometer 30. The stack desirably includes two to five sample color proof films, and mode desirably, four to five sample color proof films. This is because, even though a single color proof film is affected with less electrostatic charges, the color proof films accumulated in a stack are affected with massive electrostatic charges, as a result, the color proof films are apt to cause static clinging to one another easily.

In order for the sample color proof films to built up electrostatic charges differing stepwise from one another, one or more surface active agents selected from a group of fluorochemical surface active agents and polyoxyethylene surface active agents are added to the silver halide emulsion layers of the sample color proof films. The stepwise variations of electrostatic charges of the sample color proof films are easily realized through quantitative adjustment of these surface active agents. Further, in order for the sample color proof films to have surface resistivity differing stepwise from one another, fine particles of a metal oxide are added to the backing layers of so that the sample color proof films. The stepwise variations of surface resistivity of the sample color proof films are easily realized through quantitative adjustment of the fine particles. The same surface active agents and oxide metal as added to the sample X-Ray films may be employed for the sample proof films.

It is desirable to perform the static clinging simulation of the sample color proof films using the color printing machine 100 as a simulator equipment under the ambient conditions of a temperature in a range from 10° C. to 35° C. and a relative humidity lower than 25%, and more desirably under the ambient conditions of a temperature in a range from 20° C. to 25° C. and a relative humidity lower than 20%.

Figure 7:
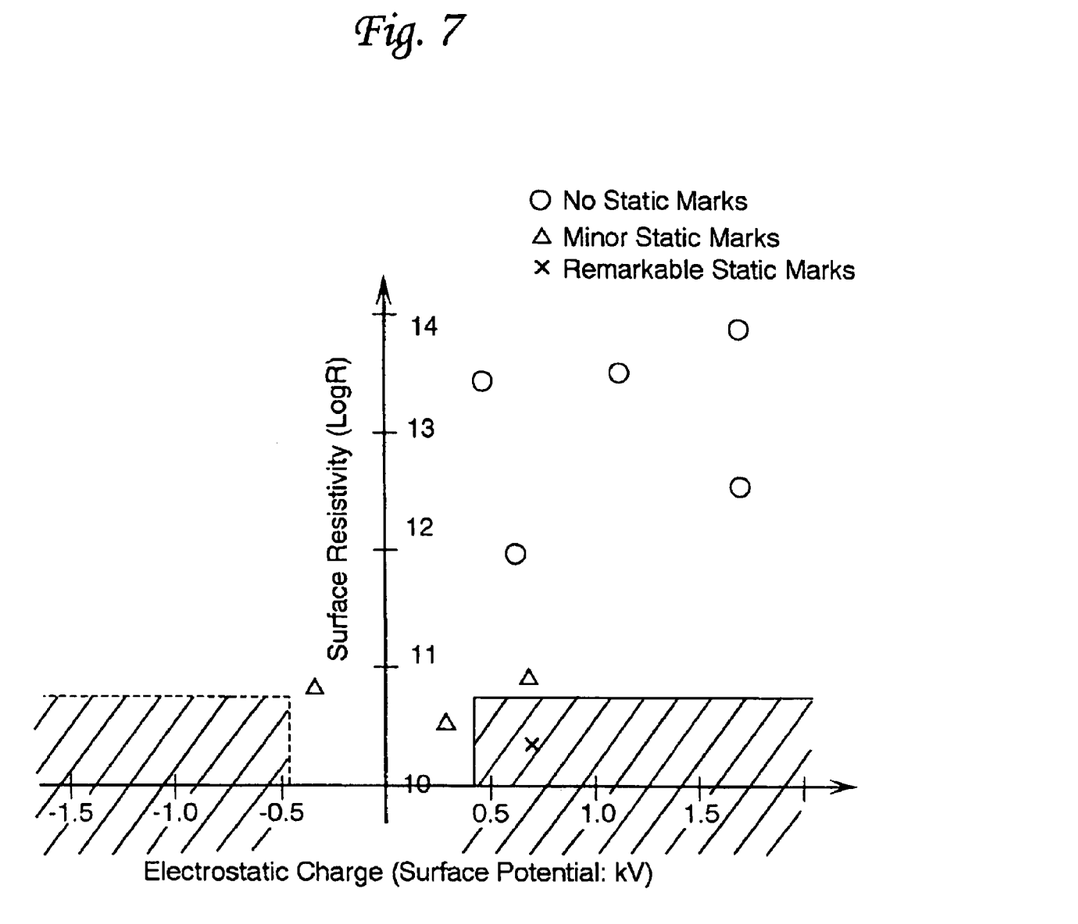
FIG. 7 is an R-V diagram showing a proper range of electrification property for prevention of static clinging between color proof films by way of example.

The R-V diagram is drawn from the result of the static clinging simulation of the sample color proof films as shown in FIG. 7 on the basis of evaluation of occurrence of static clinging. The sample color proof films that are considered acceptable as antistatic color proof films have electrification properties in a range of surface resistivity greater than $10^{11}$ $\Omega$ regardless of electrostatic charges or have electrification properties in a range of electrostatic charges from a surface potential of −0.5 kV to 0.5 kV when having surface resistivity less than $10^{11}$ $\Omega$. Accordingly, the proper range of electrification property of antistatic color proof films is a range of surface resistivity greater than $10^{9.5}$ $\Omega$ in the R-V diagram. Color proof films that are designed and manufactured so as to have electrification properties falling within the proper range is reliably prevented from causing static clinging troubles.

The following description will be directed practical examples of the simulations of static mark outbreaks and static clinging occurrences.

X-Ray Films

Figure 1:
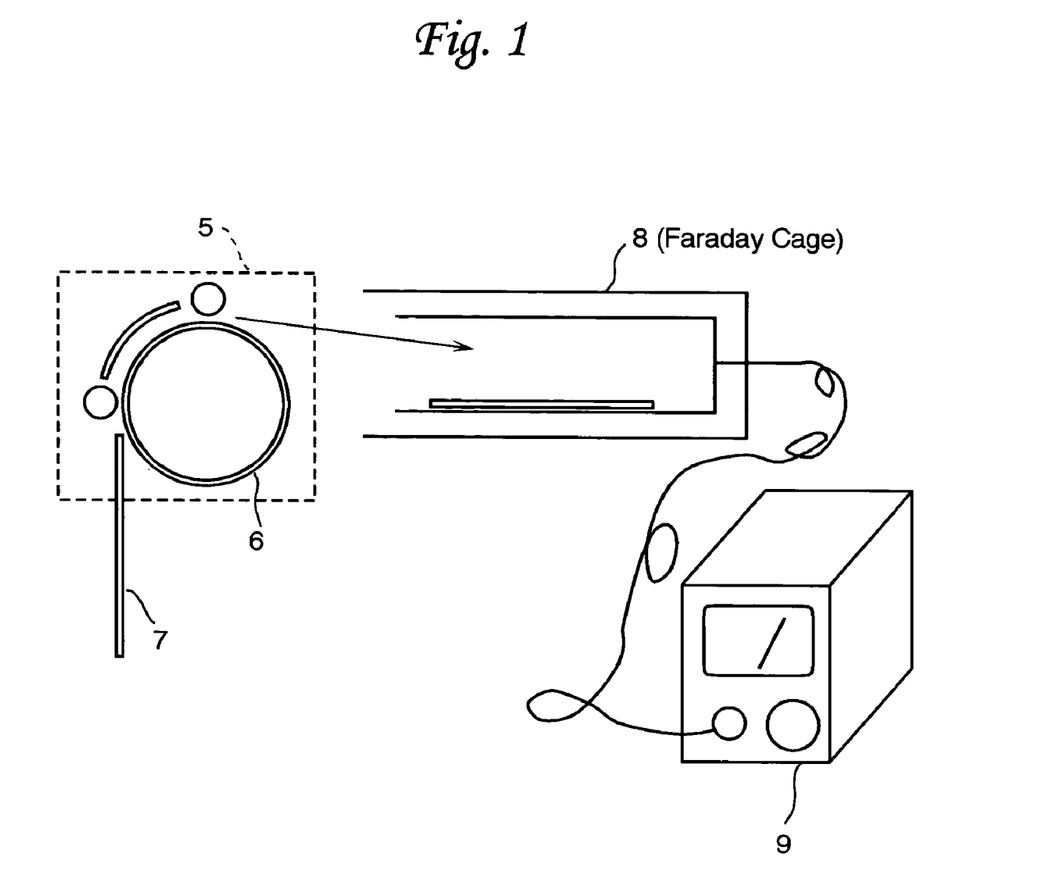
FIG. 1 is a schematic view showing simulation of electrification property of an X-Ray film.

The static mark outbreak simulation of sample X-Ray films was practically carried out by running the sample X-Ray films 7 using the transport roller 6 of the film transport mechanism 5 shown in FIG. 1 at a film transport speed of 10 m/min to 120 m/min under a nip pressure of 4 kg/cm$^2$ to 5 kg/cm$^2$ under the ambient conditions of a temperature of 20° C. and relative humidity less than 20%. Surface resistivity of the sample X-Ray films were measured by the use of a commercially available resistance meter such as, for example, ADVANTEST R8340A ULTRA HIGH RESISTANCE METER. Electrostatic charges of the sample X-Ray films were measured by the use of a commercially available electrometer such as, for example, ELECTROMETER 610C manufactured by Casely Corporation. It has been ascertained that commercially available X-Ray films are often affected with static mark troubles under these conditions.

The sample X-Ray films 7 were adjusted in electrostatic charges stepwise in a range from $-1.8 \times 10^{-9}$ Q/cm$^2$ to $2.0 \times 10^{-9}$ Q/cm$^2$ by adding a fluorochemical surface active agent expressed by the chemichal formula (I) and a polyoxyethylene surface active agent expressed by the chemichal formula (IX), each surface active agent differing in quantity stepwise in a range from 0 to 2.0 weight %, to their surface protection layers. The sample X-Ray films 7 were also adjusted in surface resistivity stepwise in a range from $10^9$ $\Omega$ to $10^{14}$ $\Omega$ by adding fine particles of a metal oxide (SnO$_2$) differently stepwise in quantity in a range from 0 to 2.0 weight %, to their surface protection layers.

Figure 2:
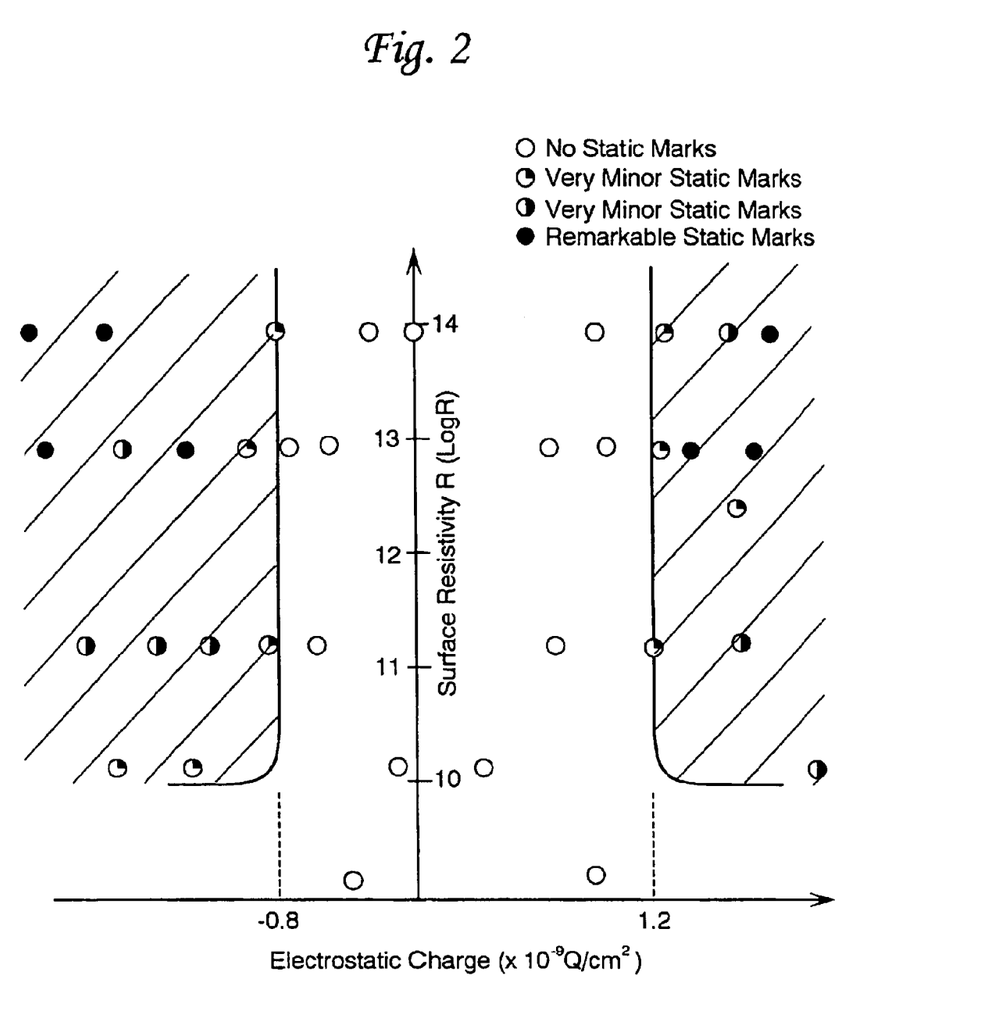
FIG. 2 is an R-V diagram showing a proper range of electrification property for prevention of static failure of an X-Ray film by way of example.

Outbreaks of static marks on the sample X-Ray films were visually observed for evaluation and the R-V diagram was drawn from the result of the evaluation as shown in FIG. 2 in which a mark ○ indicates no occurrence of static marks and other marks indicates an occurrence of static marks, very minor, minor or remarkable. As apparent from the R-V diagram, it is demonstrated that electrostatic charges are sufficient for antistatic X-Ray films to be adjusted at to a surface potential of 20V (=(-80+120)/2) in a range of surface resistivity from $10^{11}$ Ω to $10^{14}$ Ω. The proper range of electrification property for antistatic X-Ray films that are prevented from causing static marks is in a range of surface resistivity from $10^{11}$ Ω to $10^{14}$ Ω and in a range of electrostatic charge from $-0.8\times10^{-9}$ Q/cm$^2$ to $1.2\times10^{-9}$ Q/cm$^2$ (which is the region except shaded areas in the R-V diagram).

As a result of a practical demonstration of antistatic X-Ray films that were designed and manufactured so as to have electrification properties falling within the proper range, it was proved that the antistatic X-Ray films did not run into static mark troubles.

Cinematographic Color Positive Films

The static clinging outbreak simulation sample cinematographic color positive films was practically carried out by projecting the cinematographic color positive films using the horizontal platter type projector equipped with the endless film feeder 50 having chloroprene rubber brain rollers 53 as shown in FIG. 3 at a film transport speed of 60 m/min under the ambient conditions of a temperature of 24° C. and relative humidity less than 20%.

20 sample cinematographic color positive films were adjusted in electrostatic charges stepwise by adding the same surface active agents as those applied to the sample X-Ray films described above differently stepwise in quantity to their surface protection layers in the same manner as applied to the sample X-Ray films. Further, the sample cinematographic color positive films were also adjusted in surface resistivity stepwise by adding the same fine particles of a metal oxide as thoese applied to the sample X-Ray films differently stepwise in quantity to their backing layers in a similar manner applied to the sample X-Ray films.

Outbreaks of static clinging in the sample color positive films were visually observed for evaluation and the R-V diagram was drawn from the result of the evaluation as shown in FIG. 4 in which a mark ○ indicates no occurrence of static clinging and other marks indicates an occurrence of remarkable static clinging. As apparent from the R-V diagram, it is demonstrated that the proper range of electrification property for antistatic cinematographic color positive films is a range of surface resistivity higher than $10^{9.5}$ Ω regardless of electrostatic charges.

As a result of a practical demonstration of antistatic X-Ray films that were designed and manufactured so as to have electrification properties falling within the proper range, it was proved that the antistatic cinematographic color positive films did not run into static clinging troubles.

Color Proof Films

The static clinging outbreak simulation sample color proof films was practically carried out using a printing machine as a simulator equipment such as shown in FIG. 5 by printing a sample color proof film and discharging it on a stack of five printed color proof films under the ambient conditions of a temperature of 24° C. and relative humidity less than 20%. Surface resistivity of the sample X-Ray films were measured in surface potential (V) by the use of a commercially available electrometer such as, for example, TRZK 360.

30 sample color proof films were adjusted in electrostatic charge and surface resistivity stepwise from one another by adding the same surface active agents as those applied to the sample X-Ray films described above differently stepwise in quantity to their surface image forming layers in the same manner as applied to the sample X-Ray films. Further, the sample color proof films were also adjusted in surface resistivity stepwise by adding the same fine particles of a metal oxide as thoese applied to the sample X-Ray films differently stepwise in quantity to their backing layers in a similar manner applied to the sample X-Ray films.

Outbreaks of static clinging of the sample color proof films were examined for evaluation and the R-V diagram was drawn from the result of the evaluation as shown in FIG. 7 which a mark ○ indicates no occurrence of static clinging and other marks indicates an occurrence of remarkable static clinging. As apparent from the R-V diagram, it is demonstrated that the proper range of electrification property for antistatic color proof films is a range of surface resistivity higher than $10^{11}$ Ω regardless of electrostatic charges and a range of electrostatic charges expressed in surface potential from $-0.5$ kV to $+0.5$ kV for surface resistivity less than $10^{11}$ Ω. Electrostatic charges of the sample color proof films were measured by the use of a commercially available electrometer such as, for example, TRZK ELECTROMETER 360.

As a result of a practical demonstration of antistatic X-Ray films that were designed and manufactured so as to have electrification properties falling within the proper range, it was proved that the antistatic color proof films did not run into static clinging troubles.

It is to be understood that, although the present invention has been described with regard to various preferred embodiments thereof, various other embodiments and variants may occur to those skilled in the art, which are within the scope and spirit of the invention, and such other embodiments and variants are intended to be covered by the following claims.

What is claimed is:

1. A method of manufacturing an antistatic film comprising the steps of:
    preparing a plurality of sample films with electrostatic charges (V) and surface resistivity (R), at least one of said electrostatic charges (V) and surface resistivity (R) differing stepwise from one another;
    making a simulation of static trouble outbreaks by running said sample films through a given simulation equipment under specified conditions;
    expressing electrostatic charges (V) and surface resistivity (R) of said sample films that cause static troubles in said simulation of static troubles in an orthogonal R-V coordinate diagram;
    defining a proper range of electrostatic property for said antistatic film on said R-V orthogonal coordinate diagram that excludes electrostatic charges (V) and surface resistivity (R) of said sample films that cause unacceptable static troubles; and
    designing and manufacturing said antistatic film so as to satisfy said proper range of electrostatic property.

2. A method of manufacturing antistatic films as defined in claim 1, wherein said proper range of electrostatic charges (V) and surface resistivity (R) is defined accordingly to types and intended applications of antistatic films.

3. A method of manufacturing antistatic films as defined in claim 1, wherein said antistatic film is an X-Ray film with a surface protection layer and sample X-Ray films are made different stepwise in electrostatic charges by adding one or more surface active agents selected from the group consisting of fluorochemical surface active agents and polyoxyethylene surface active agents to surface protection layers of said sample X-Ray films.

4. A method of manufacturing antistatic films as defined in claim 3, wherein said simulation of static trouble outbreaks is carried out under ambient conditions of a temperature in a range from 10° C. to 35° C. and a relative humidity lower than 25%.

5. A method of manufacturing antistatic films as defined in claim 3, wherein said simulation of static trouble outbreaks is carried out under the greatest level of loading that is applied to said antistatic X-Ray films during practical use.

6. A method of manufacturing antistatic films as defined in claim 3, wherein said simulation of static trouble outbreaks is carried out by running said sample X-Ray film by rollers made of either one of chloroprene rubber and nitrile rubber under conditions of a film transport speed in a range from 10 m/min to 20 m/min and a nip pressure in a range from 4 kg/cm$^2$ to 5 kg/cm$^2$.

7. A method of manufacturing antistatic films as defined in claim 3, wherein said proper range of electrostatic property for said antistatic X-Ray film is defined by a range of surface resistivity from $10^{11}$ Ω to $10^{14}$ Ω between electrostatic charges of $-0.8\times10^{-9}$ and $1.2\times10^{-9}$ Q/cm$^2$.

8. A method of manufacturing antistatic films as defined in claim 1, wherein said antistatic film is an X-Ray film with a surface protection layer and sample X-Ray films are made different stepwise in surface resistivity by adding fine particles of a metal oxide selected from the group consisting of ZnO, TiO$_2$, SnO$_2$, TAl$_2$O$_3$, In$_2$O$_3$, SiO$_2$, MgO, BaO and MoO to surface protection layers of said sample X-Ray films.

9. A method of manufacturing antistatic films as defined in claim 8, wherein said simulation of static trouble outbreaks is carried out under ambient conditions of a temperature in a range from 10° C. to 35° C. and a relative humidity lower than 25%.

10. A method of manufacturing antistatic films as defined in claim 8, wherein said simulation of static trouble outbreaks is carried out under the greatest level of loading that is applied to said antistatic X-Ray films during practical use.

11. A method of manufacturing antistatic films as defined in claim 8, wherein said simulation of static trouble outbreaks is carried out by running said sample X-Ray film by rollers made of either one of chloroprene rubber and nitrile rubber under conditions of a film transport speed in a range from 10 m/min to 20 m/min and a nip pressure in a range from 4 kg/cm$^2$ to 5 kg/cm$^2$.

12. A method of manufacturing antistatic films as defined in claim 8, wherein said proper range of electrostatic property for said antistatic X-Ray film is defined by a range of surface resistivity from $10^{11}$ Ω to $10^{14}$ Ω between electrostatic charges of $-0.8\times10^{-9}$ and $1.2\times10^{-9}$ Q/cm$^2$.

13. A method of manufacturing antistatic films as defined in claim 1, wherein said antistatic film is an endless cinematographic film wound in a roll.

14. A method of manufacturing antistatic films as defined in claim 13, wherein sample cinematographic color positive films have surface protection layers which are made different stepwise in electrostatic charges by adding one or more surface active agents selected from the group consisting of fluorochemical surface active agents and polyoxyethylene surface active agents to said surface protection layers.

15. A method of manufacturing antistatic films as defined in claim 13, wherein said sample cinematographic color positive films have backing layers, respectively, which are made different stepwise in surface resistivity by adding fine particles of a metal oxide selected from the group consisting of ZnO, TiO$_2$, SnO$_2$, TAl$_2$O$_3$, In$_2$O$_3$, SiO$_2$, MgO, BaO and MoO to said backing layers.

16. A method of manufacturing antistatic films as defined in claim 13, wherein said simulation of static trouble outbreaks is carried out under the greatest level of loading that is applied to said antistatic cinematographic color positive films during practical use.

17. A method of manufacturing antistatic films as defined in claim 13, wherein said simulation of static trouble outbreaks is carried out by running said sample cinematographic color positive film by brain rollers made of either one of chloroprene rubber and nitrile rubber under conditions of a film transport speed in a range from 10 m/min to 20 m/min and a nip pressure in a range from 4 kg/cm$^2$ to 5 kg/cm$^2$.

18. A method of manufacturing antistatic films as defined in claim 13, wherein said simulation of static trouble outbreaks is carried out under ambient conditions of a temperature in a range from 10° C. to 35° C. and a relative humidity lower than 25%.

19. A method of manufacturing antistatic films as defined in claim 1, wherein said antistatic film is a color proof film and said simulation of static trouble outbreaks is carried out under a condition that a sample color proof film is ejected into a stack of a plurality of sample color proof films.

20. A method of manufacturing antistatic films as defined in claim 19, wherein said stack comprises at most five said sample color proof films.

21. A method of manufacturing antistatic films as defined in claim 19, wherein said antistatic is a color proof film having a surface protection layer and sample color proof films are made different stepwise in electrostatic charges by adding one or more surface active agents selected from the group consisting of fluorochemical surface active agents and polyoxyethylene surface active agents to said surface protection layers.

22. A method of manufacturing antistatic films as defined in claim 21, wherein said sample color proof film have backing layers, respectively, which are made different stepwise in surface resistivity by adding fine particles of a metal oxide selected from the group consisting of ZnO, TiO$_2$, SnO$_2$, TAl$_2$O$_3$, In$_2$O$_3$, SiO$_2$, MgO, BaO and MoO to said backing layers.

23. A method of manufacturing antistatic films as defined in claim 21, wherein said simulation of static clinging outbreaks is carried out under ambient conditions of a temperature in a range from 10° C. to 35° C. and a relative humidity lower than 25%.

24. A method of manufacturing antistatic electrostatic property for said antistatic color proof film is defined by a range of surface resistivity greater than $10^{11}$ Ω regardless of electrostatic charges and a range of surface resistivity less than $10^{11}$ Ω between surface potentials of $-0.5$ kV and $0.5$ kV $10^{-9}$.

* * * * *